United States Patent
Sugiyama

(10) Patent No.: US 8,724,192 B2
(45) Date of Patent: May 13, 2014

(54) IMAGE FORMING APPARATUS AND IMAGE FORMING SYSTEM

(75) Inventor: Takashi Sugiyama, Okazaki (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 691 days.

(21) Appl. No.: 12/731,584

(22) Filed: Mar. 25, 2010

(65) Prior Publication Data
US 2010/0302597 A1    Dec. 2, 2010

(30) Foreign Application Priority Data
May 29, 2009  (JP) ................................. 2009-130372

(51) Int. Cl.
*H04N 1/46*   (2006.01)
*G06F 3/12*   (2006.01)
*H04N 1/40*   (2006.01)
*H04N 1/60*   (2006.01)

(52) U.S. Cl.
USPC ......... 358/505; 358/504; 358/1.13; 358/1.15; 358/518; 358/461; 399/13; 399/8; 399/81; 399/82; 399/49

(58) Field of Classification Search
USPC .......... 358/1.15, 504, 1.13, 518, 523; 702/57; 399/8, 49, 43
See application file for complete search history.

(56) References Cited

U.S. PATENT DOCUMENTS

| 5,204,761 A * | 4/1993 | Gusmano ...................... 358/461 |
| 6,160,968 A * | 12/2000 | Noda ................................ 399/8 |
| 6,204,873 B1 * | 3/2001 | Shimazaki .................... 347/172 |
| 7,188,036 B2 * | 3/2007 | Strittmatter ..................... 702/57 |
| 7,471,409 B2 * | 12/2008 | Kurakata ..................... 358/1.15 |
| 7,486,414 B2 * | 2/2009 | Arai ................................ 358/1.9 |
| 7,813,660 B2 * | 10/2010 | Takahashi et al. .............. 399/43 |
| 2004/0136025 A1 * | 7/2004 | Moriyama et al. ........... 358/1.14 |

(Continued)

FOREIGN PATENT DOCUMENTS

| JP | 2002-172833 | 6/2002 |
| JP | 2002-189391 | 7/2002 |

(Continued)

OTHER PUBLICATIONS

Notification of Reasons for Refusal dispatched Jan. 20, 2011 in Japanese Application No. 2009-130372 and partial English translation thereof.

(Continued)

*Primary Examiner* — Akwasi M Sarpong
(74) *Attorney, Agent, or Firm* — Banner & Witcoff, Ltd.

(57) ABSTRACT

An image forming apparatus and an image forming system are provided. An image forming apparatus or system includes a reception unit configured to receive a print job; a print unit configured to execute the print job received by the reception unit to print an image; an adjustment unit configured to execute an image quality adjustment for the printing; a determination unit configured to determine whether an adjustment execution condition is to be met during the execution of the print job; and a control unit configured to execute a priority process which, when the determination unit determines that the adjustment execution condition is to be met, causes the adjustment unit to execute the image quality adjustment before a start of the execution of a condition meeting print job, for which the determination unit determines that the adjustment execution condition is to be met.

14 Claims, 13 Drawing Sheets

(56) References Cited

U.S. PATENT DOCUMENTS

| | | |
|---|---|---|
| 2006/0159468 A1* | 7/2006 | Kouchi et al. .................. 399/13 |
| 2006/0197966 A1* | 9/2006 | Viturro et al. .................. 358/1.9 |
| 2007/0053710 A1* | 3/2007 | Shibaki et al. .................. 399/81 |
| 2007/0070460 A1* | 3/2007 | Yamada .................. 358/504 |
| 2011/0109928 A1* | 5/2011 | Radtke et al. .................. 358/1.9 |

FOREIGN PATENT DOCUMENTS

| | | |
|---|---|---|
| JP | 2002-229278 | 8/2002 |
| JP | 2003-025691 | 1/2003 |
| JP | 2004-142250 A | 5/2004 |
| JP | 2004-252573 | 9/2004 |
| JP | 2006-082243 A | 3/2006 |
| JP | 2006-195074 A | 7/2006 |
| JP | 2007-072294 A | 3/2007 |
| JP | 2007-090561 | 4/2007 |
| JP | 2007-098613 A | 4/2007 |

OTHER PUBLICATIONS

JP Office Action dated Aug. 30, 2011, corresponding JP Application No. 2011-060247; English Translation.

* cited by examiner

IMAGE FORMING APPARATUS AND IMAGE FORMING SYSTEM

CROSS-REFERENCE TO RELATED APPLICATION

This application claims priority from Japanese Patent Application No. 2009-130372, filed on May 29, 2009, the entire subject matter of which is incorporated herein by reference.

TECHNICAL FIELD

Aspects of the present invention relate to an image forming apparatus and an image forming system which have a function for adjusting image quality.

An image forming apparatus has a function for adjusting image quality called registration or calibration which measures and corrects a deviation in an image forming position or an image density. This image quality adjustment is executed when a predetermined adjustment execution condition is met, for example, when the number of printing sheets from the previous image quality adjustment reaches a predetermined value, or when a predetermined time has lapsed from the previous image quality adjustment.

In a related art, when the adjustment execution condition is met during the execution of a print job, a print operation is stopped immediately after the adjustment execution condition is met so as to execute the image quality adjustment, or the image quality adjustment is executed after the print job has been completed. In the latter case, a user waiting time can be reduced.

In the former case, when the image quality adjustment is executed during the print job, there are concerns that image quality substantially changes between the pages before and after the image quality adjustment. In the latter case, when the execution of the image quality adjustment is delayed until after the print job is completed, there are concerns that the image quality cannot be ensured.

SUMMARY

An aspect of the present invention provides an image forming apparatus and an image forming system which can perform the image quality adjustment at an appropriate timing or can ensure image quality.

According to an illustrative embodiment of the present invention, there is provided an image forming apparatus comprising: a reception unit configured to receive a print job; a print unit configured to execute the print job received by the reception unit to print an image; an adjustment unit configured to execute an image quality adjustment for the printing; a determination unit configured to determine whether an adjustment execution condition is to be met during the execution of the print job; and a control unit configured to execute a priority process which, when the determination unit determines that the adjustment execution condition is to be met, causes the adjustment unit to execute the image quality adjustment before a start of the execution of a condition meeting print job, for which the determination unit determines that the adjustment execution condition is to be met.

According to another illustrative embodiment of the present invention, there is provided an image forming apparatus comprising: a reception unit configured to receive a print job; a print unit configured to execute the print job received by the reception unit to print an image; an adjustment unit configured to execute an image quality adjustment for the printing; a determination unit configured to determine whether an adjustment execution condition is to be met during the execution of the print job; and a control unit configured to execute a priority process which, when a condition meeting print job, for which the determination unit determines that the adjustment execution condition is to be met, includes a color page, causes the adjustment unit to execute the image quality adjustment before a start of printing of a first color page in the condition meeting print job.

According to a further illustrative embodiment of the present invention, there is provide an image forming system comprising: a generation unit configured to generate a print job; a reception unit configured to receive the print job generated by the generation unit; a print unit configured to execute the print job received by the reception unit to print an image; an adjustment unit configured to execute an image quality adjustment for the printing; a determination unit configured to determine whether an adjustment execution condition is to be met during the execution of the print job; and a control unit configured to execute a priority process which, when the determination unit determines that the adjustment execution condition is to be met, causes the adjustment unit to execute the image quality adjustment before a start of the execution of a condition meeting print job, for which the determination unit determines that the adjustment execution condition is to be met.

According to a further illustrative embodiment of the present invention, an image forming apparatus comprising: a reception unit configured to receive a print job; a print unit configured to execute the print job received by the reception unit to print an image; an adjustment unit configured to execute an image quality adjustment for the printing; a determination unit configured to determine whether an adjustment execution condition is to be met during the execution of the print job; a designation unit configured to, when the determination unit determines that the adjustment execution condition is to be met, designate a timing at which the image quality adjustment is executed; and a control unit configured to cause the adjustment unit to execute the image quality adjustment at the timing designated by the designation unit.

According to the above configuration, when it is determined whether the adjustment execution condition is to be met during the execution of the print job and the condition is determined to be met, a priority process can be performed to adjust image quality before the print job starts to be executed or before the start of the printing of the first color page included in the print job. Since the image quality adjustment is executed by the priority process before the print job is executed or before the start of the printing of the color page, a sufficient image quality can be ensured.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Illustrative Embodiment 1

Illustrative embodiment 1 according to the present invention will be described with reference to FIGS. 1 to 3.

(Configuration of Printer and Computer)

Figure 1:
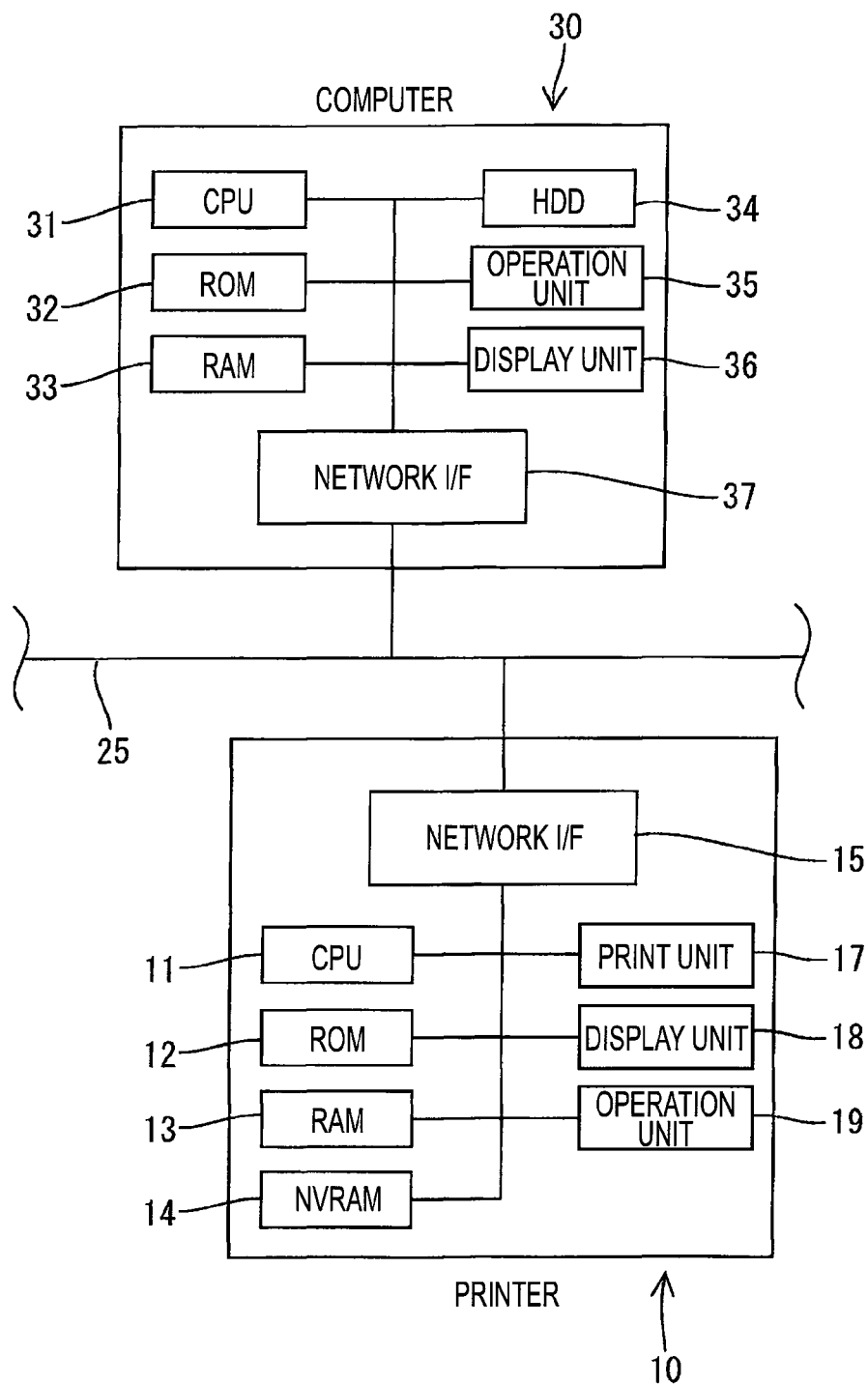
FIG. 1 is a block diagram schematically illustrating the configuration of a printer according to illustrative embodiments 1 to 7 and a computer connected thereto.

A printer 10 as shown in FIG. 1 is an example of an image forming apparatus according to this illustrative embodiment. The printer 10 is connected with a computer 30 which is an example of an information processing apparatus.

The printer 10 includes a Central Processing Unit (CPU) 11, a Read Only Memory (ROM) 12, a Random Access Memory (RAM) 13, a Non-Volatile RAM (NVRAM) 14, and a network interface 15. The ROM 12 stores programs which execute various operations of the printer 10 such as a print job executing process (described later). The CPU 11 controls each components of the printer 10 according to the programs read from the ROM 12 while storing the results of the process in the RAM 13 or the NVRAM 14. The network interface 15 is connected to one or plural computers 30 or the like via a communication line 25 so as to execute data communication therewith.

The printer 10 further includes a print unit 17, a display unit 18 and an operation unit 19. The print unit 17 forms an image by an electrophotographic method, for example, so as to print a color image or a monochrome image on a sheet (as an example of a recording medium) based on a print job to be described. The display unit 18 includes a display, a lamp or the like so as to display various setting screens or operation status of the printer 10. The operation unit 19 includes plural buttons which allow a user to input various instructions.

The computer 30 includes a CPU 31, a ROM 32, a RAM 33, a hard disk driver 34, an operation unit 35 having a keyboard or a pointing device, a display unit 36 having a display or the like, and a network interface 37 connected to the communication line 25. The hard disk driver 34 stores various programs such as application software for generating image data to be printed or a printer driver for controlling the printer 10.

(Print Job Executing Process)

After a printer driver for the printer 10 is started and the print conditions are set, upon an instruction to execute printing is input, the CPU 31 of the computer 30 generates print job data and transmits it to the printer 10 via the network interface 37. The print job data includes a print execution instruction and also includes, for example, a user name (login user name of the computer 30), a file name, setting values of various printing conditions, information such as a transmitting date which are referred to as attribute information of a print job, image data or the like.

When receiving the print job data via the network interface 15, the CPU 11 of the printer 10 executes a reception process which registers the print job data as a print job in a print queue configured in the RAM 13. When the print job is registered in the print queue, the CPU 11 starts a print job executing process for controlling the execution of the print job and image quality adjustment as described below.

Herein, the image quality adjustment is a process executed to secure sufficient image quality such as a positional deviation correction or a density correction (described later). In the print job executing process, one or plural print jobs which are registered in the print queue at the start time thereof are processed as a target job(s). The target jobs are executed in the order of registration in the print queue. A print job registered in the print queue is deleted after the print job is completed.

Figure 2:
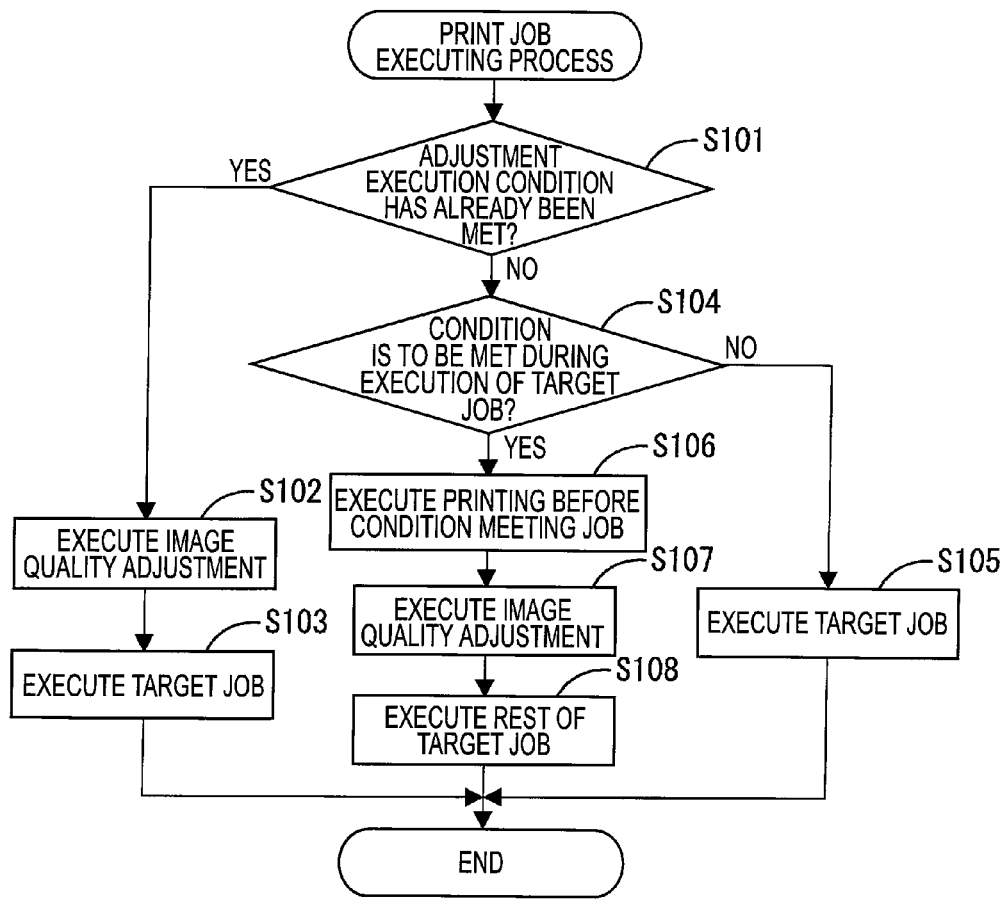
FIG. 2 is a flow chart illustrating a print job executing process according to the illustrative embodiment 1.

As shown in FIG. 2, in the print job executing process, the CPU 11 determines whether the adjustment execution condition has been already met (S101). The adjustment execution condition is a condition for determining whether the printer 10 needs image quality adjustment. For example the adjustment execution condition includes whether the number of printing sheets after the previous image quality adjustment reaches a predetermined reference value or whether a lapsed time from the previous image quality adjustment reaches a predetermined reference value.

When the adjustment execution condition has already been met (S101: Yes), the CPU 11 executes the image quality adjustment (S102). For example, when the positional deviation correction is executed as the image quality adjustment, the CPU 11 causes the print unit 17 to form a pattern including respective color marks and measures the positions of the marks by an optical sensor so as to detect an amount of deviation from an ideal position of each color, and stores correction values for reducing the deviations in the NVRAM 14. At the time of printing, the CPU 11 reads the correction values stored in the NVRAM 14 and executes correction on an image forming position of each color based on the correction values.

After executing the image quality adjustment, the CPU 11 executes the target job (S103) and completes the print job executing process. When a new print job is registered in the print queue during the print job executing process, after the CPU 11 completes the print job executing process for the target job, the CPU 11 sets the newly registered print job as a target job and executes the print job executing process again.

When the adjustment execution condition has not been met at the time of starting the print job executing process (S101: No), the CPU 11 determines whether the adjustment execution condition is to be met during the execution of a target job (S104). That is, at the operation S104, the CPU 11 determines, if an unprocessed print job registered in the print queue were executed without the image quality adjustment therebefore, whether the adjustment execution condition is to be met during the execution of the print job. When it is determined that the adjustment execution condition is not to be met during the execution of the target job (S104: No), the target job is executed (S105), and then the print job executing process is completed.

When it is determined that the adjustment execution condition is to be met during the execution of the target job (S104: Yes), among the target jobs, a print job(s) before a print job for which it is determined that the adjustment execution condition is to be met (which is also referred to as a "condition meeting job") is executed (S106). When there is no print job before the condition meeting job, the operation S106 is omitted. Subsequently, the CPU 11 executes the image quality adjustment (S107). Then, the CPU 11 executes the rest of the target job(s) (S108). That is, at the operation S108, the CPU 11 executes the condition meeting job and the subsequent print job, if any. Then, the CPU 11 completes the print job executing process.

Figure 3:
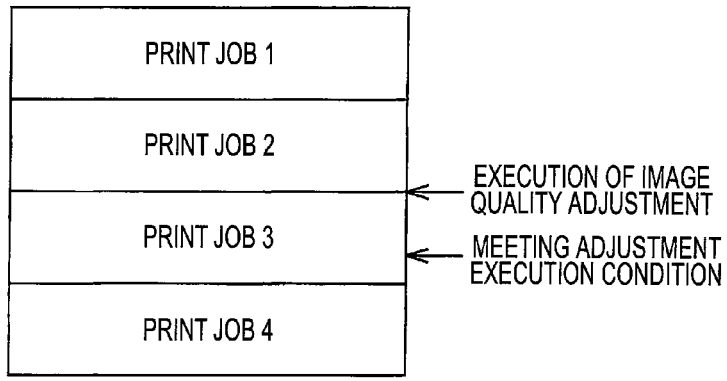
FIG. 3 is a diagram illustrating a relationship between a print job and execution timing of image quality adjustment according to the illustrative embodiment 1.

FIG. 3 shows an example of execution timing of the image quality adjustment when the print jobs 1 to 4 are set as the target jobs and the print job executing process is executed thereon. In FIG. 3, the print jobs 1 to 4 are processed from top to bottom. A timing at which the image quality adjustment is executed and a timing at which the adjustment execution condition is met are shown with arrows, respectively. That is, in this example, it is determined that the adjustment execution condition is to be met during the execution of the print job 3. Therefore, after the previous print job 2 is completed, the image quality adjustment is executed before the print job 3 is executed.

Advantages of Illustrative Embodiment 1

According to this illustrative embodiment, it is determined whether the adjustment execution condition is to be met during the execution of the print job, and when it is determined that the condition is to be met, a priority process (S106 to S108) which executes the image quality adjustment before a start of the execution of the print job can be executed. By executing the image quality adjustment in the priority process before the print job is executed, a sufficient image quality can be ensured. In addition, since there is reduced the possibility that the image quality adjustment is executed during the execution of the print job, a change in image quality during the print job can be suppressed.

It is noted that, when the adjustment execution condition is met during the execution of the print job and the priority process has not been performed, the image quality adjustment is executed after the print job for which it is determined that the adjustment execution condition is met is completed. By executing the image quality adjustment after the print job is completed, a user waiting time can be reduced. In addition, by not executing the image quality adjustment during the print job, the change in image quality can be suppressed between the print sheets.

Further, in this illustrative embodiment, the image quality adjustment is described as to be executed immediately before the start of the print job for which it is determined that the adjustment execution condition is to be met (condition meeting job), however, the timing of the image quality adjustment is not limited thereto. For example, when there is a target job(s) before the condition meeting job, the image quality adjustment may be executed before the target job(s) is executed (for example, before the print job 1 shown in FIG. 3 is executed).

Illustrative Embodiment 2

Next, the illustrative embodiment 2 according to the present invention will be described with reference to FIGS. 4 and 5. In the following illustrative embodiments 2 to 7, the configurations of the printer 10 and the computer 30 are same as those of the illustrative embodiment 1, and the same configurations are designated by same reference numerals and the description thereof will be omitted. In the print job executing process shown in FIG. 4, the same processes as those of FIG. 2 are designated by the same reference numerals and the descriptions thereof will be omitted.

Figure 4:
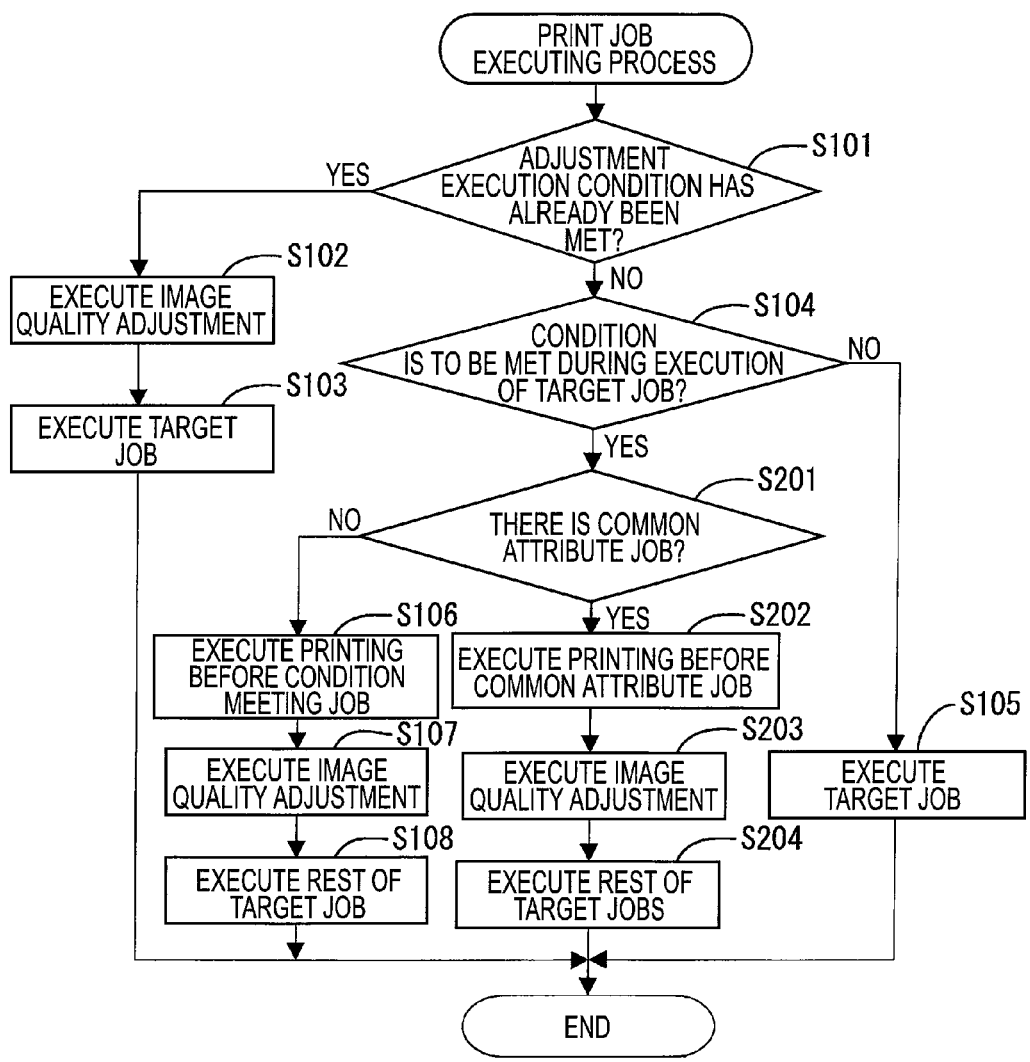
FIG. 4 is a flow chart illustrating a print job executing process according to the illustrative embodiment 2.

In the print job executing process shown in FIG. 4, when determining that the adjustment execution condition is to be met during the execution of a target job (S104: Yes), the CPU 11 determines whether there is a common attribute job in the target jobs (S201). Here, the common attribute job is one or plural print job having a specific attribute in common with that of the condition meeting job, and is to be executed before the condition meeting job and successively to the condition meeting job. The specific attribute is one or plural attribute among a user name, a file name, setting values of various print conditions and a reception time of the job. It is determined that a print job is the common attribute job if the reception time of the print job is sufficiently close to the reception time of the condition meeting job.

When there are no common attribute job (S201: No), similarly to the operations S106 to S108 of FIG. 2, the CPU 11 executes the print jobs before the condition meeting job in the target jobs, and then executes the image quality adjustment. Then, the rest of the target jobs are executed.

When there is the common attribute job (S201: Yes), the CPU 11 executes the print job before the common attribute job in the target jobs (S202). When there is no print job before the common attribute job, the operation 5202 is omitted. Subsequently, the image quality adjustment is executed (S203), and then the rest of the target jobs are executed (S204). And, the print job executing process is completed.

Figure 5:
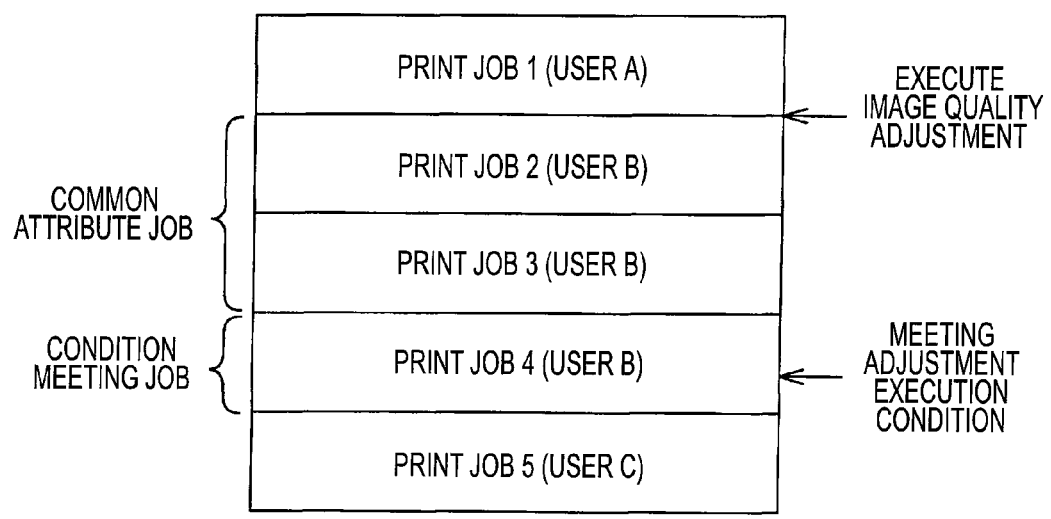
FIG. 5 is a diagram illustrating a relationship between a print job and execution timing of image quality adjustment according to the illustrative embodiment 2.

FIG. 5 shows an example of the execution timing of the image quality adjustment when the print jobs 1 to 5 are set to the target jobs and the print job executing process is executed thereon. In FIG. 5, the print job 4 is the condition meeting job. The print jobs 2 and 3 have a user name (attribute) common as that of the condition meeting job 4 and are to be executed before the condition meeting job 4 and successively to the condition meeting job 4, that is, the print jobs 2 and 3 are the common attribute jobs. In this example, by the operations S202 to 5204 described above, the print jobs will be executed in the order of "Print Job 1"→"Image Quality Adjustment"→"Print Jobs 2 and 3 (Common Attribute Job)"→"Print Job 4 (Condition Meeting Job)"→"Print Job 5".

According to this illustrative embodiment, when there is a print job which has an attribute in common with the print job for which it is determined that the adjustment execution condition is to be met before the print job, the image quality adjustment is executed as a priority process before the start of the execution of the print job with the common attribute (S202 to S204). That is, it is likely that between print jobs having a common attribute such as a user name, a document name, a print setting, or a reception time of the print job, it would be desired less change in image quality. According to the configuration of this illustrative embodiment, the change in image quality between the print jobs with a common attribute can be suppressed.

When the print job for which it is determined that the adjustment execution condition is to be met is not successive to a print job having a common attribute, that is, if a print job which has no common attribute is to be executed in between (the relationship is low), and when the image quality adjustment is executed before the print job having the common attribute, the execution of the print job which has no common attribute (for example, a user name is different) is delayed by the time for the image quality adjustment. However, according to the configuration of this illustrative embodiment, the image quality adjustment is executed when the print jobs having common attribute successively, the problem can be avoided.

Further, according to this illustrative embodiment, even when the print job for which it is determined that the adjustment execution condition is to be met is not successive to the print job having a common attribute, the image quality adjustment may be executed before the print job having the common attribute.

Illustrative Embodiment 3

Next, the illustrative embodiment 3 according to the present invention will be described with reference to FIGS. 6 and 7. The same operations as those of FIG. 2 in the print job executing process shown in FIG. 6 is designated by the same reference numerals and the description thereof will be omitted.

Figure 6:
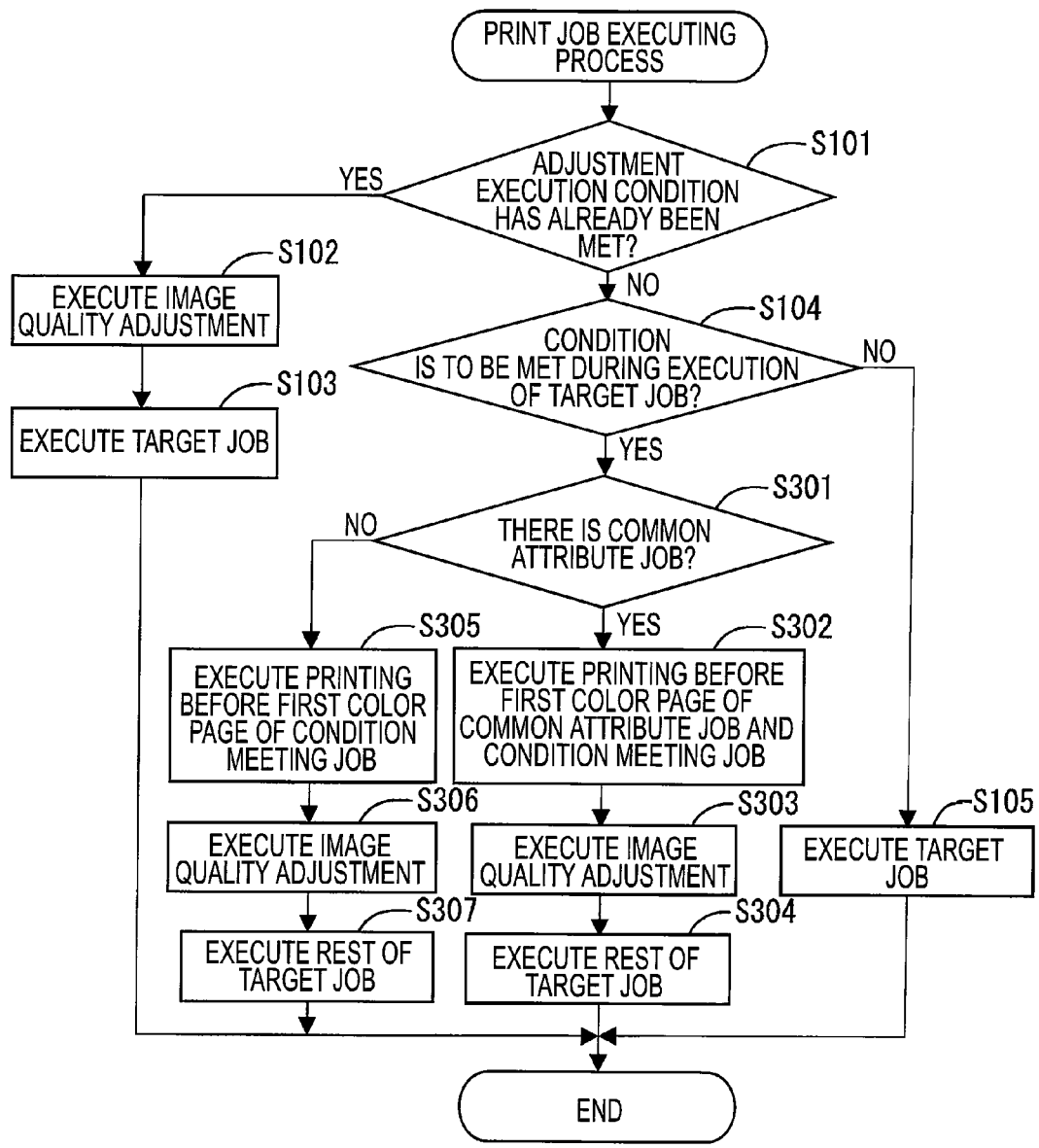
FIG. 6 is a flow chart illustrating a print job executing process according to the illustrative embodiment 3.

In the print job executing process shown in FIG. 6, when the CPU 11 determines that the adjustment execution condition is to be met during the execution of the target job (S104: Yes), it is determined whether there is the above-described common attribute job in the target job (S301). When there is the common attribute job (S301: Yes), printing is executed before a first color page in the condition meeting job or the common attribute job in the target jobs (S302). If the page of the common attribute job to be first printed is a color page and there is no print job before the common attribute job, the operation S302 is omitted.

In addition, when a color page is not included in the condition meeting job and the common attribute job, printing is executed in the operation 5302 until the last page of the condition meeting job. Subsequently, the CPU 11 performs the image quality adjustment (S303), and thereafter the rest of the target job is executed (S304). When there is no more target job, the operation S304 is omitted.

When there is no common attribute job (S301: No), the CPU 11 executes printing before the first color page included in the condition meeting job in the target job (S305). When the page of the condition meeting job to be first printed is a color page and there is no print job before the condition meeting job, the operation S305 is omitted. In addition, when a color page is not included in the condition meeting job, printing is executed in the operation 5305 until the last page of the condition meeting job. Subsequently, the CPU 11 executes the image quality adjustment (S306), and then executes the rest of the target job (S307). When there is no more target job, the operation S307 is omitted.

Figure 7:
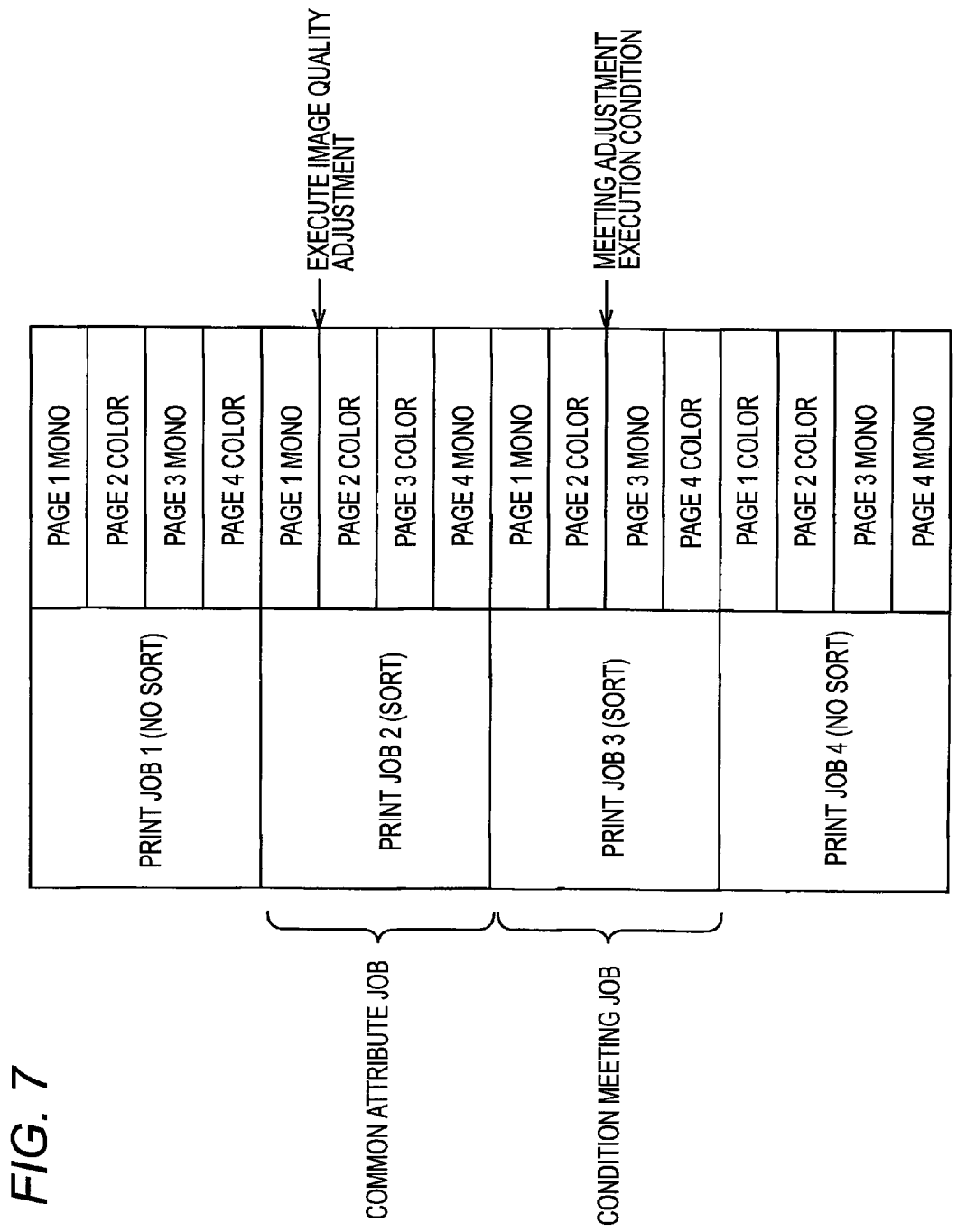
FIG. 7 is a diagram illustrating a relationship between a print job and execution timing of image quality adjustment according to the illustrative embodiment 3.

Here, FIG. 7 shows an example of the execution timing of the image quality adjustment when the print job executing process in which the print jobs 1 to 4 are the target jobs is executed. As shown in FIG. 7, the print jobs 1 to 4 are jobs, each of which prints four color or monochrome pages. The print job 3 is the condition meeting job, and the print job 2 is the common attribute job having a sort output setting (as an example of attribute) which is one of the print conditions in common with the print job 3 and which is successively executed before the condition meeting job 3.

In this example, printing is executed up to the page 1 of the print job 2 before the first color page of the print job 2 (common attribute job) by the operation S302 to S304 described above, and then the image quality adjustment is executed. Then, printing is executed from the page 2 of the first color page of the print job 2 to the last page 4 of the print job 4.

As described above, in this illustrative embodiment, it is determined whether the adjustment execution condition is to be met during the execution of a print job, and when it is determined that the condition is to be met, a priority process (S302 to S304 or S305 to S307) which executes the image quality adjustment before a start of the printing of the first color page in the print job can be executed. Generally, high quality tends to be required at the color printing compared with the monochrome printing. Therefore, the image quality adjustment is executed by the priority process before the first color page is printed, so that a sufficient image quality can be ensured. In addition, when the plural color pages are included in the print job, there is reduced a possibility that the image quality adjustment is executed during printing these color pages, so that a change in image quality between the color pages can be suppressed.

When there is a print job which has an attribute in common with the print job for which it is determined that adjustment execution condition is to be met before the print job, the image quality adjustment is executed as the priority process before the first color page included in these print jobs starts to be printed (S302 to S304). That is, it is likely that between print jobs having a common attribute with each other, it would be desired less change in image quality. According to the configuration of this illustrative embodiment, for the color page included in the print job with common attribute, a change in image quality can be suppressed.

Further, in this illustrative embodiment, when it is determined that adjustment execution condition is to be met during the execution of a print job, printing may be executed before the first color page of the condition meeting job without determining whether there is a common attribute job, and the image quality adjustment may be executed (S305 to S307). In addition, in the same case, printing may be executed before the first color page in all the target jobs, and the image quality adjustment may be executed.

Illustrative Embodiment 4

Next, the illustrative embodiment 4 according to the present invention will be described with reference to FIGS. 8 and 9. In the print job executing process shown in FIG. 8, the same operations as those of FIG. 2 are designated by the same reference numerals and the descriptions thereof will be omitted.

Figure 8:
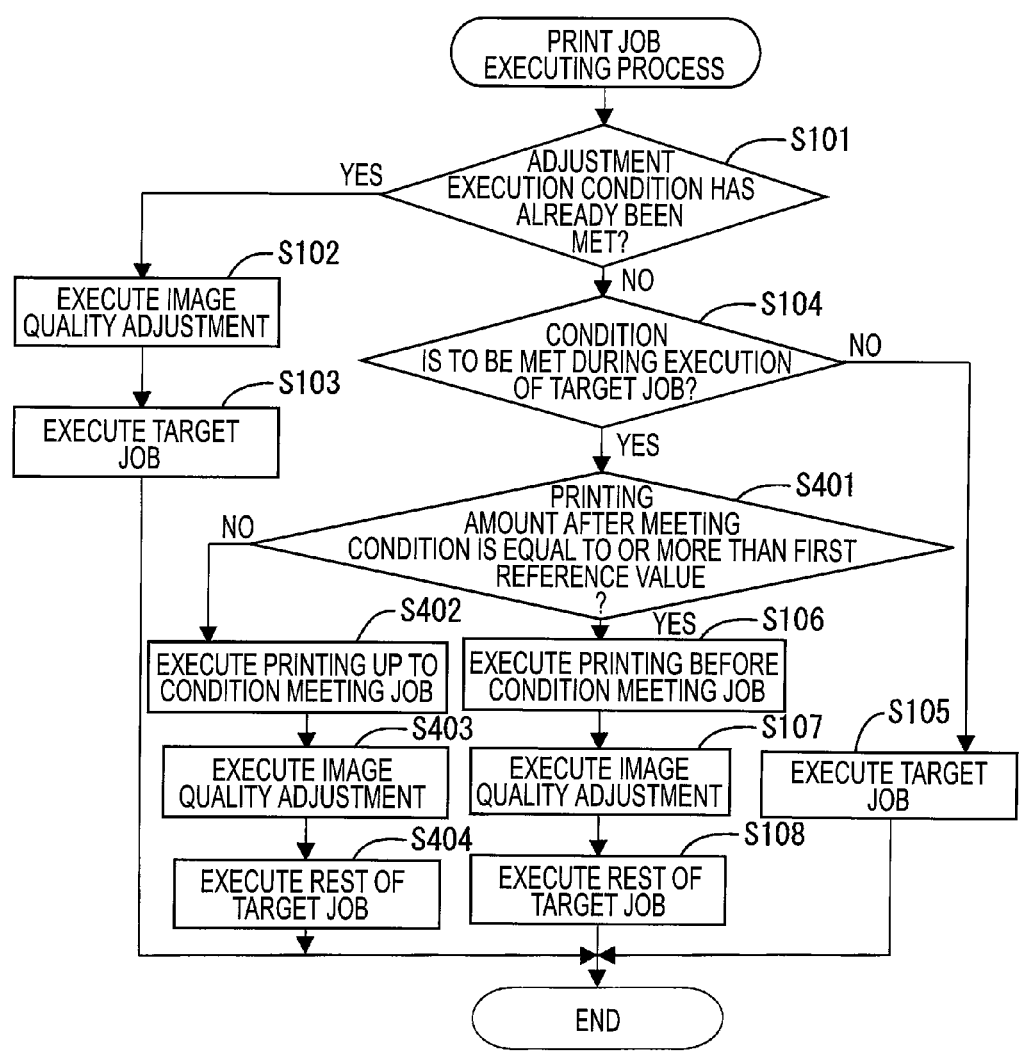
FIG. 8 is a flow chart illustrating a print job executing process according to the illustrative embodiment 4.

In the print job executing process shown in FIG. 8, when it is determined that the adjustment execution condition is to be met during the execution of a target job (S104: Yes), the CPU 11 determines whether a printing amount after the adjustment execution condition is met is equal to or more than a first reference value (S401). Here, for example, the number of printing times or the number of printing pages (that is, absolute printing amount) after the adjustment execution condition is met may be compared with a reference value. Alternatively, a ratio of the number of printing sheets (or the number of printing pages) after the condition is met to the number of the total printing sheets (or the number of printing pages) in the condition meeting job may be compared with a reference value.

Figure 9:
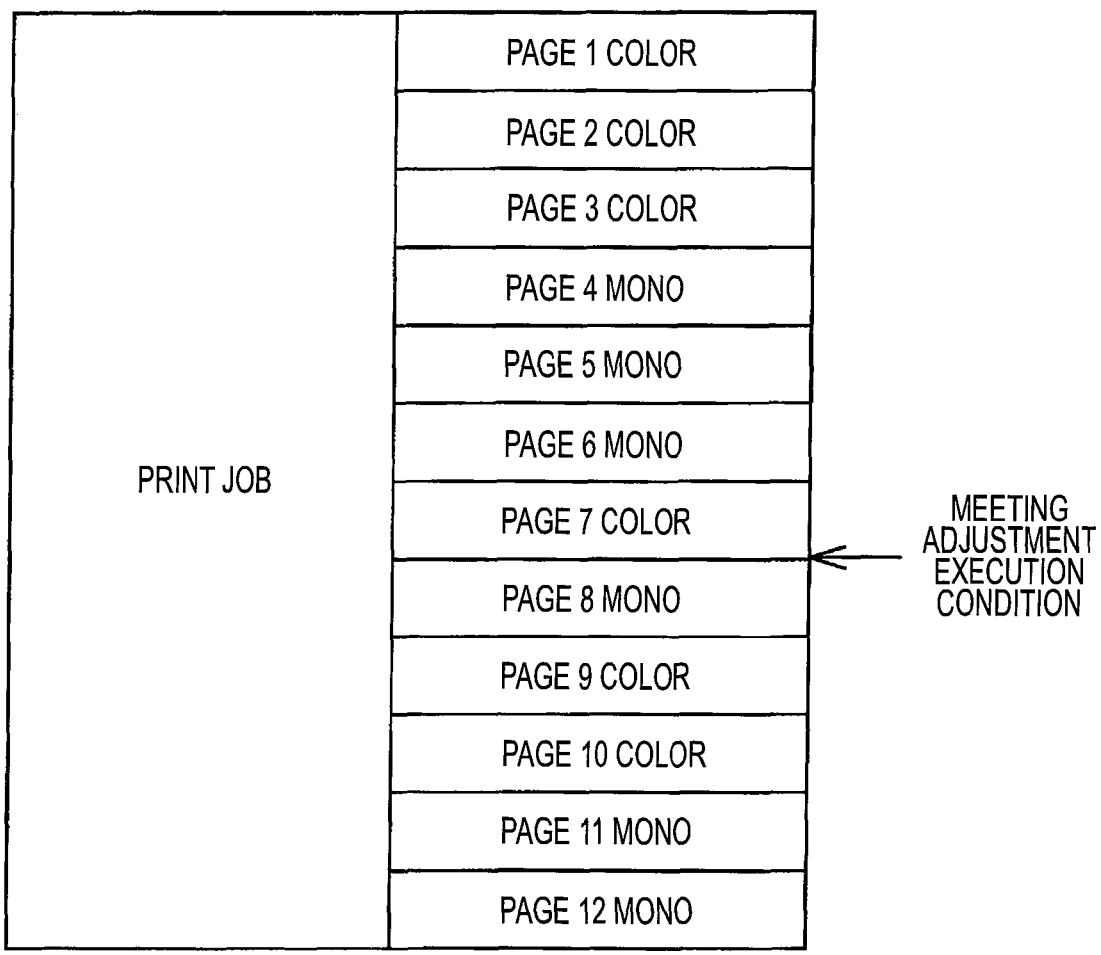
FIG. 9 is a diagram illustrating a relationship between a print job and execution timing of image quality adjustment according to the illustrative embodiment 4.

For example, in the example shown in FIG. 9, in the print job including 12 pages, the adjustment execution condition is met when the page 7 is completed. In this example, the number of printing pages after the adjustment execution condition is met is five pages (absolute printing amount), the pages 8 to 12, the ratio (relative printing amount) to the number of the total printing pages is 5/12.

When the printing amount after the adjustment execution condition is met is equal to or more than a first reference value (S401: Yes), the CPU 11 executes the priority process similar to that of the operations S106 to S108 shown in FIG. 2. That is, in this case, after the print job before the condition meeting job in the target jobs is executed, the image quality adjustment is executed, and then the rest of the target job is executed. When the printing amount after the adjustment execution condition is met is not equal to or more than the first reference value (S401: No), printing is executed up to the condition meeting job in the target job (S402). That is, in this case, the priority process is not executed. The CPU 11 executes the image quality adjustment (S403), and performs the rest of the target job (S404). When there is no more target job, the operation 5404 is omitted.

According to this illustrative embodiment, when the printing amount after the adjustment execution condition is met is equal to or more than the first reference value, the priority process is executed. That is, when the printing amount after the adjustment execution condition is met is relatively large, the image quality adjustment is first executed by the priority process, so that image quality for a large number of printing sheets can be ensured and a large effect can be obtained. On the contrary, when the printing amount after the adjustment execution condition is met is relatively small, it might be considered that the degradation in image quality is small even though the image quality adjustment is not executed. Accordingly, the priority process can be executed in an appropriate timing.

Further, when the printing amount after the adjustment execution condition is met is not equal to or more than the first reference value, the image quality adjustment is executed after the condition meeting job is completed. Therefore, a waiting time for the condition meeting job, which is generated by the image quality adjustment can be avoided.

Further, when it is determined whether the printing amount after the adjustment execution condition is met is equal to or more than the first reference value (S401), each page included in the print job may be identified whether to require high image quality, and the printing amount of only the pages requiring high image quality may be used. The page requiring high quality is a page with high requirement for the image quality adjustment. For example, the printing amount of only the color pages may be used. In this case, for example, in FIG. 9, two pages of the pages 9 and 10 are the printing amount after the adjustment execution condition is met. In addition, for example, when the resolution at the time of printing can be set in plural steps, the number of only the pages which are set in high resolution may be the printing amount.

Illustrative Embodiment 5

Next, the illustrative embodiment 5 according to the present invention will be described with reference to FIG. 10. The print job executing process shown in FIG. 10 is changed from FIG. 8 only in the operation S401, and the other operations are designated by the same reference numeral as those in FIG. 8, and the detailed description thereof will be omitted.

Figure 10:
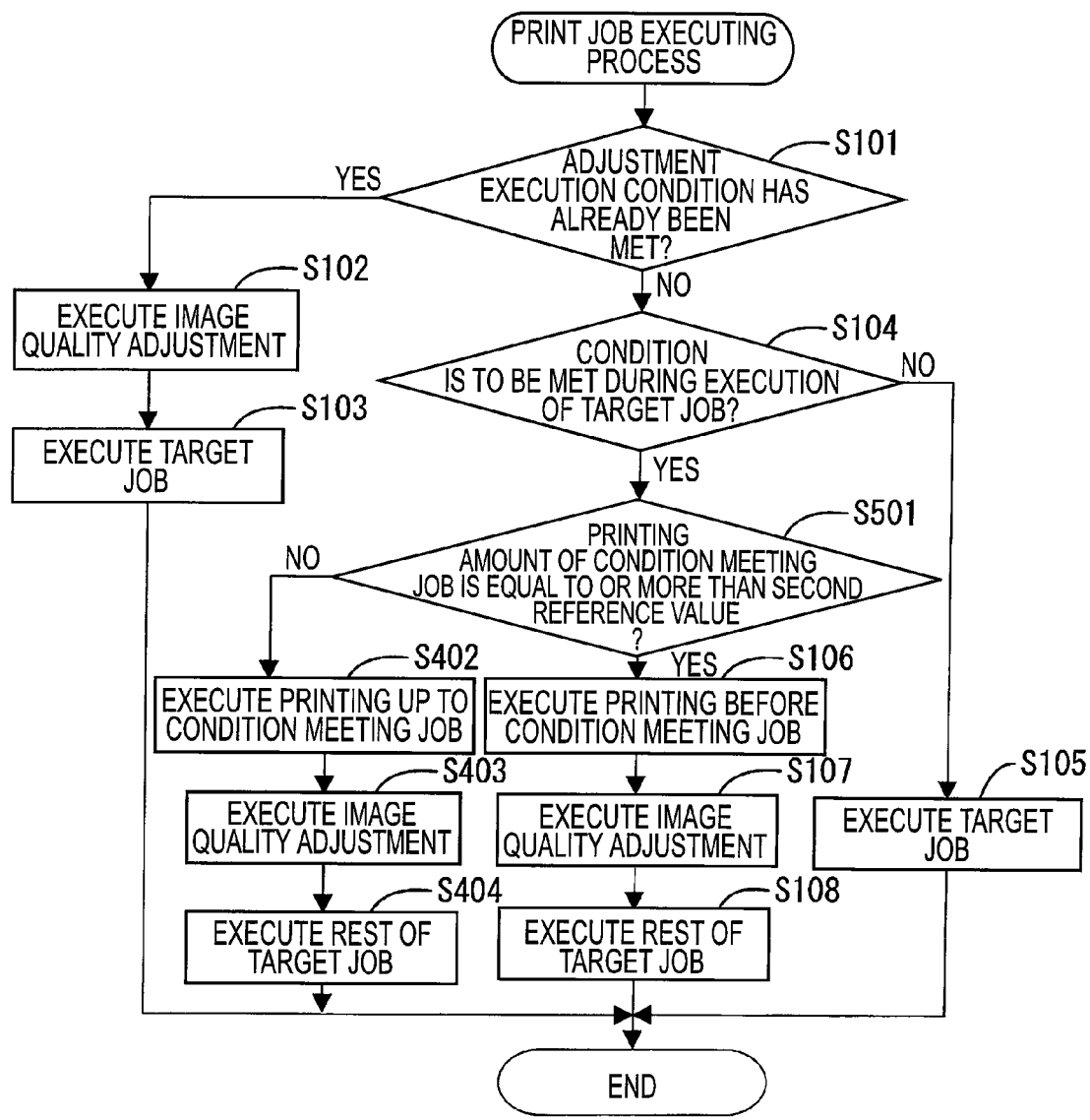
FIG. 10 is a flow chart illustrating a print job executing process according to the illustrative embodiment 5.

In the print job executing process shown in FIG. 10, when it is determined that the adjustment execution condition is to be met during the execution of a target job (S104: Yes), the CPU 11 determines whether a printing amount of the condition meeting job is equal to or more than a second reference value (S501). Here, the number of printing times or the number of printing pages of the condition meeting job is compared with a reference value as the printing amount.

When the printing amount of the condition meeting job is equal to or more than the second reference value (S501: Yes), the CPU 11 executes the same priority process as the operations S106 to S108 shown in FIG. 2. When the printing amount of the condition meeting job is not equal to or more than the second reference value (S501: No), the CPU 11 executes the same operations as those of S402 to S404 shown in FIG. 8 without executing the priority process.

According to this illustrative embodiment, when the printing amount of the condition meeting job is equal to or more than the second reference value, the priority process is executed. That is, when the printing amount of the condition meeting job is relatively large, the image quality adjustment is first executed by the priority process, so that image quality of a large number of printing sheets can be ensured, and a large effect can be obtained. On the contrary, when the printing amount is relatively small, it might be considered that the degradation in image quality is small even though the image quality adjustment is not executed. Therefore, the priority process can be executed in an appropriate timing.

Further, when the printing amount of the condition meeting job is not equal to or more than the second reference value, the image quality adjustment is executed after the condition meeting job is completed, so that a waiting time for the condition meeting job, which is generated by the image quality adjustment can be avoided.

Further, when it is determined whether the printing amount of the condition meeting job is equal to or more than the second reference value (S501), each page included in the print job may be identified whether to require high image quality, and the printing amount of only the pages requiring high image quality may be used.

Illustrative Embodiment 6

Next, the illustrative embodiment 6 according to the present invention will be described with reference to FIG. 11. The same operations as those in FIG. 2 among the print job executing process shown in FIG. 11 are designated by the same reference numerals and the detailed descriptions thereof will be omitted.

Figure 11:
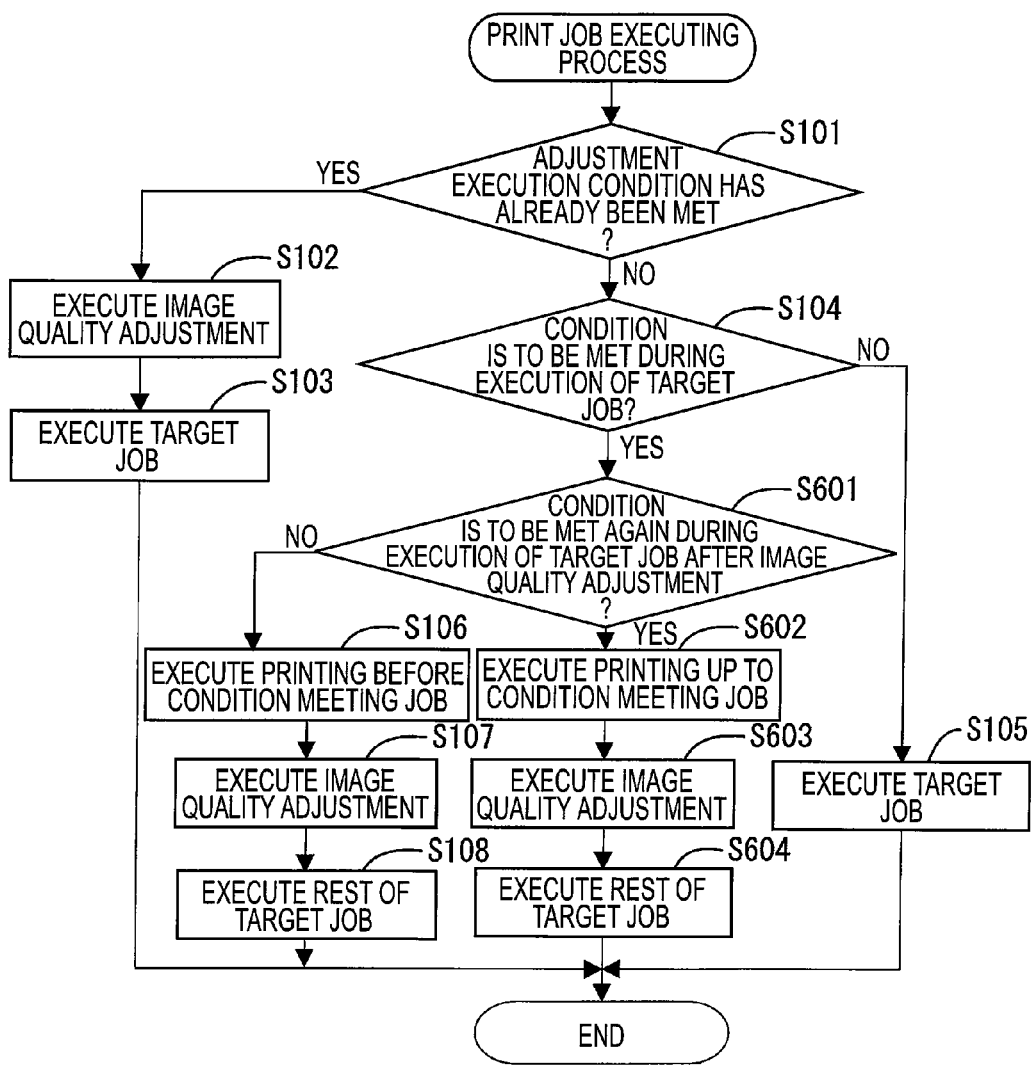
FIG. 11 is a flow chart illustrating a print job executing process according to the illustrative embodiment 6.

In the print job executing process shown in FIG. 11, when it is determined that the adjustment execution condition is to be met during the execution of a target job (S104: Yes), and when the priority process (S106 to S108) is executed, the CPU 11 determines whether the adjustment execution condition is to be met again during the execution of the condition meeting job (S601). When it is determined that the adjustment execution condition is not to be met again (S601: No), the CPU 11 executes the same priority process as the operations S106 to S108 shown in FIG. 2.

When it is determined that the adjustment execution condition is to be met again during the execution of the condition meeting job (S601: Yes), the target job is executed until the adjustment execution condition is met (S602). Then, the condition meeting job is stopped when the adjustment execution condition is met, and the image quality adjustment is executed (S603), and then the rest of the target job is executed (S604).

According to this illustrative embodiment, when the priority process is executed on the print job for which it is determined that the adjustment execution condition is to be met during the execution, and when it is determined that the adjustment execution condition is to be met during the execution of the same print job, the priority process is not executed, but the image quality adjustment is executed after the adjustment priority process is met. That is, when the adjustment execution condition is to be met during the execution of the same print job even though the image quality adjustment is executed before the print job by the adjustment priority process (for example, when a relatively large amount of printing is executed), it is likely that the effect from executing the priority process is not so large. Accordingly, in this case, by not executing the priority process, the priority process can be executed in an appropriate timing.

Illustrative Embodiment 7

Next, the illustrative embodiment 7 according to the present invention will be described with reference to FIGS. 12 to 14. This illustrative embodiment shows an example in which the present invention is applied to an image forming system including the printer 10 and the computer 30 shown in FIG. 1.

Figure 13:
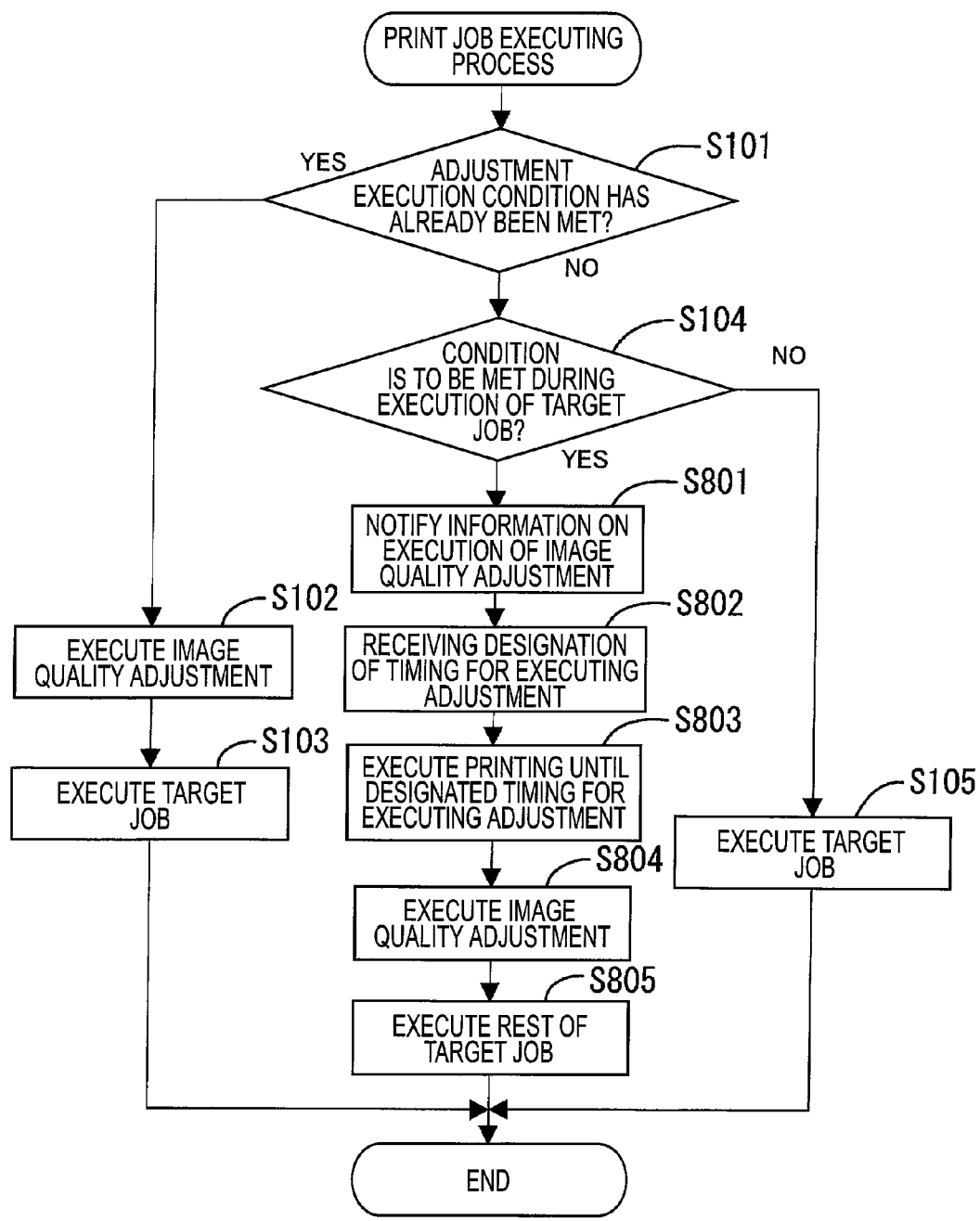
FIG. 13 is a flow chart illustrating a print job executing process according to the illustrative embodiment 7.
Figure 14:
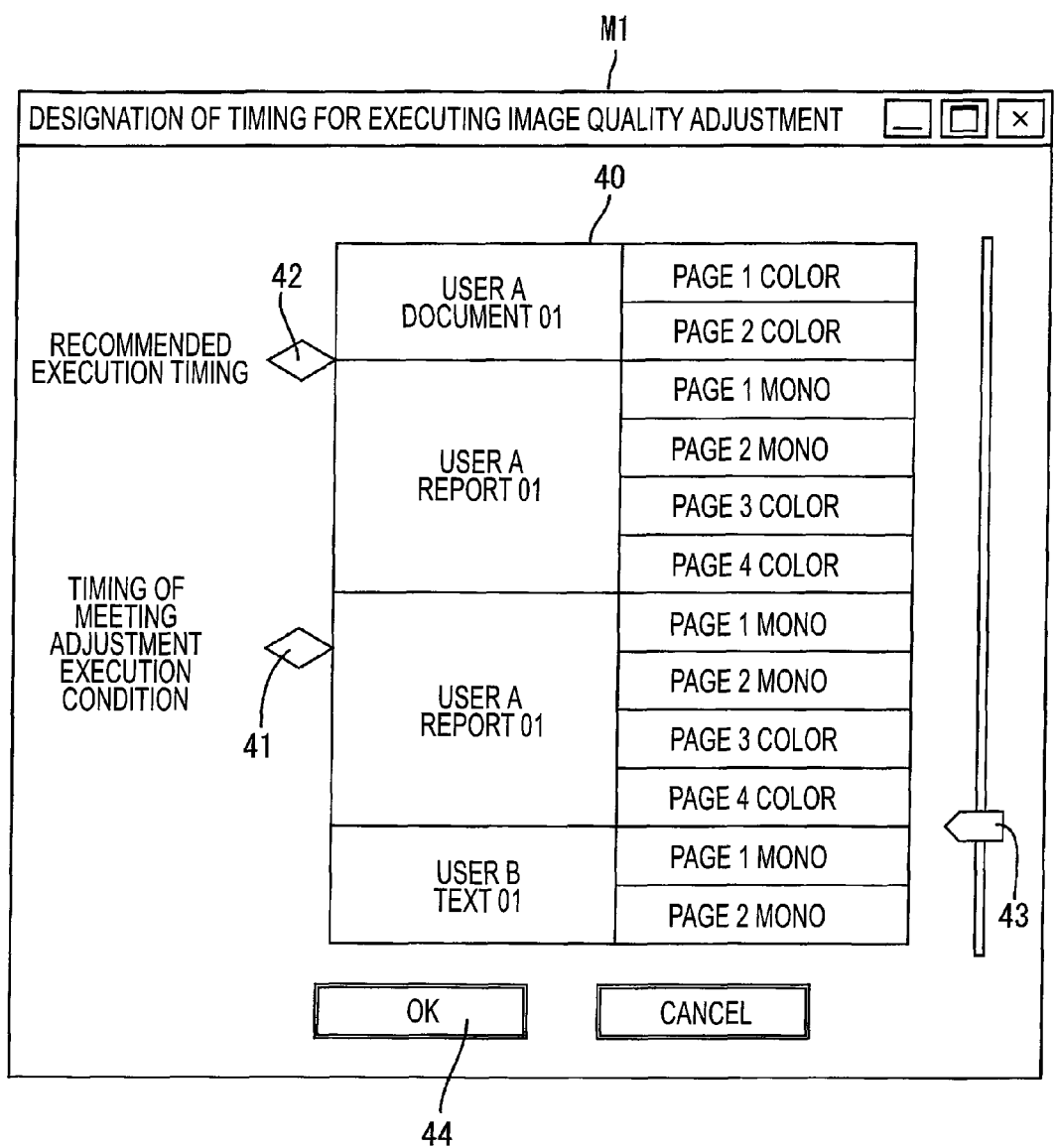
FIG. 14 is a diagram illustrating a designation screen according to the illustrative embodiment 7.

The same operations as those in FIG. 2 among the print job executing process shown in FIG. 13 are designated by the same reference numerals, and the detailed description will be omitted.

Figure 12:
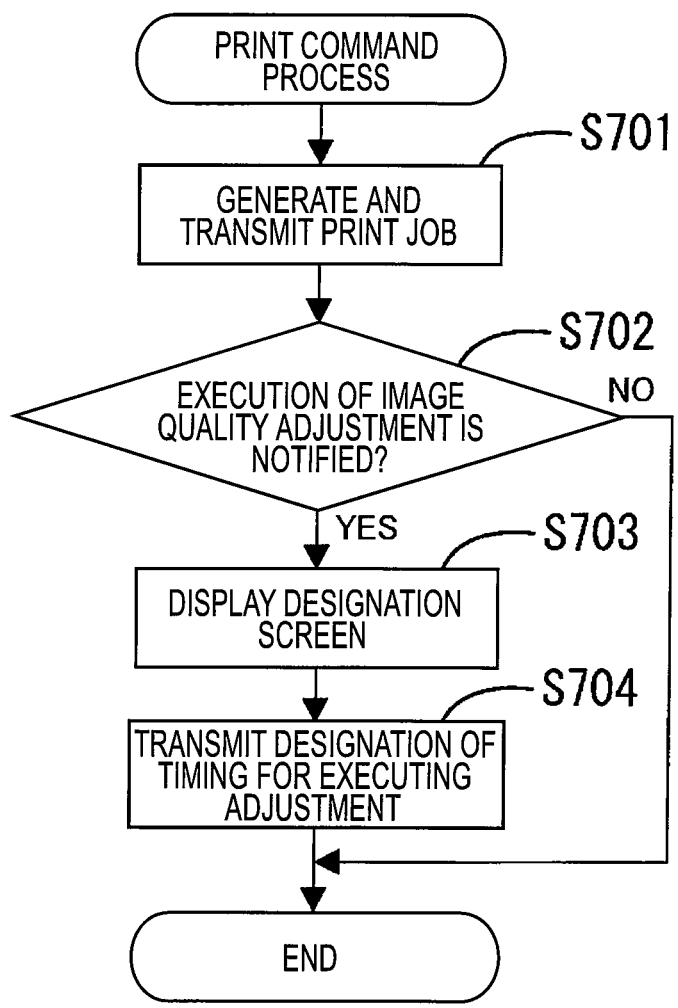
FIG. 12 is a flow chart illustrating a print command process according to the illustrative embodiment 7.

When a user starts a printer driver for the printer 10 on the computer 30, inputs setting of the print conditions and then inputs execution instruction for printing, the CPU 31 executes a print command process shown in FIG. 12 based on the printer driver. At first, the CPU 31 generates the above-described print job data in the print command process and transmits the data to the printer 10 via the network interface 37 (S701). Then, the CPU 31 waits to receive an adjustment execution notification (described later) from the printer 10 (S702), and when the adjustment execution notification is not received in a predetermined time period (S702: No), the print command process is completed.

When it is determined that the adjustment execution condition is to be met during the execution of a target job in the print job executing process shown in FIG. 13 (S104: Yes), the CPU 11 of the printer 10 generates the adjustment execution notification for notifying information on the execution of the image quality adjustment and, for example, transmits the notification to the computer 30 which is a transmission source of the condition meeting job (S801). The adjustment execution notification includes, for example, execution order of each print job included in the target job, identification information (user name, file name, etc.) for identifying a print job, a timing at which the adjustment execution condition is to be met, a recommended execution timing (described later) when the image quality adjustment is executed before the condition meeting job is executed by a priority process, and the like.

When the computer 30 receives the adjustment execution notification transmitted from the printer 10 via the network interface 37 at the operation 5702 of FIG. 12 (S702: Yes), for example, a designation screen M1 shown in FIG. 14 is displayed on the display 18 (S703). In a target job displaying area 40 of the designation screen M1, a user name ("User A", etc.) and a file name ("Document 01" etc.) are displayed as the identification information with respect to each of four print jobs included in the target job, and all of which are displayed in an order of executing the print jobs from top to bottom. In addition, in the target job displaying area 40, the number of pages included in each print job and the printing order thereof are displayed in the order of the page number from top to bottom, and a setting value (color, monochrome) of the print condition for each page is displayed.

In addition, in the designation screen M1, the timing determined to meet the adjustment execution condition is displayed by a position of a mark 41 which is provided on the left side of the target job display area 40. Further, in the designation screen M1, the recommended execution timing for adjusting image quality is displayed by a position of a mark 42 which is provided in the left side of the target job displaying area 40.

Here, the print job (second print job) having the same file name as that of the condition meeting job (third print job) is set to the common attribute job, and the timing immediately before the common adjustment job is set to the recommended execution timing for adjusting image quality. That is, when the image quality adjustment is executed at the recommended execution timing, the priority process is executed.

In addition, on the right side of the target job displaying area 40, a slider 43 is provided which is movable in the vertical direction according to the input from the operation unit 35. The slider 43 is used for designating a timing for executing the image quality adjustment, and a user can move the slider 43 before and after each print job displayed in the target job display area or between the respective pages during the print job.

When the OK button 44 of the designation screen M1 is clicked by the operation unit 35, the CPU 31 closes the designation screen M1, and transmits the execution timing for adjusting image quality which is displayed by the position of slider 43 at that time as the designation information, to the printer 10.

In the operation S802 shown in FIG. 13, when the CPU 11 of the printer 10 receives the designation information of the execution timing for adjusting image quality transmitted from the computer 30, the CPU 11 executes the target job until the execution timing for adjusting image quality which is designated in the designation information (S803). When the execution timing for adjusting image quality is designated before any target job, the operation S803 is omitted. Subsequently, the CPU 11 executes the image quality adjustment (S804), and then executes the rest of the target jobs (S805). Further, when the execution timing for adjusting image quality is designated after all the target jobs, the operation 5805 is omitted. That is, in this illustrative embodiment, when the execution timing is designated before the start of the execution of the condition meeting job in the designation screen M1, the priority process of is executed.

According to this illustrative embodiment, when it is determined that the adjustment execution condition is to be met by any one of the plural print jobs, the relationship between the execution order of the plural print jobs and the timing at which the adjustment execution condition is to be met is notified. Therefore, a user can grasp the state of the printer 10.

In addition, when the relationship is notified, the identification information (user name, file name, print page, etc.) of the plural print job is also notified. Therefore, a user can identify each print job.

In addition, when it is determined that the adjustment execution condition is to be met during the execution of the print job, the timing at which the image quality adjustment is executed can be designated from the plural timings including at least the timing at which the image quality adjustment is executed when the priority process is executed. Therefore, a user can cause the image quality adjustment to be executed at a desired timing.

In addition, the relationship between the execution order of the print jobs, the execution timing of the image quality adjustment when the priority process is executed, and the execution timing of the image quality adjustment when the priority process is performed is notified. Therefore, a user can grasp the effect when the priority process is executed.

In this illustrative embodiment, when the timing for executing the image quality adjustment is designated, a designating range may be limited. For example, the range may be set from immediately before the condition meeting job to immediately after the condition meeting job, or from immediately before a print job (three print jobs of the user A in FIG. 14) having the same user name as the condition meeting job to immediately after the print job.

Further, in this illustrative embodiment, when the timing for executing the image quality adjustment is designated, the cancel of the execution of the image quality adjustment may be also designated.

Further, in the this illustrative embodiment, when the adjustment execution condition has been already met at the time of starting the print job executing process, the image quality adjustment is always executed before the target job is executed. The timing for adjusting image quality may be designated by a user.

The notification relating to the execution of the image quality adjustment may be transmitted to all the transmission sources of the target jobs, or may be transmitted to a specific user such as a manager, or may be displayed on the display unit 18 of the printer 10. The timing for executing image quality may be designated from, for example, the operation unit 35.

In this illustrative embodiment, the designation of the execution timing for adjusting image quality can be input in the unit of page. However, the designation of the execution timing for adjusting image quality may be limited to only immediately before and after the print job.

Further, for example, when a double-sided print is executed on the front and rear surfaces of the sheet one by one in the print job, the image quality adjustment may not be executed when the front and rear pages of the same sheet are being printed.

Further, in this illustrative embodiment, the content of the print job is displayed in the unit of one page, but it may be displayed in the unit of plural pages such as 20 pages, and the execution timing for adjusting image quality may be also designated in the unit of plural pages.

The technique which allows a user to designate the execution timing for adjusting image quality, or the technique which notifies the execution timing for the print job can be also applied to an image forming apparatus which does not execute the priority process. For example, when the adjustment execution condition is met during the execution of the print job, the execution timing for adjusting image quality may be designated in a range after the condition is met.

Other Illustrative Embodiments

While the present invention has been shown and described with reference to certain illustrative embodiments thereof, it will be understood by those skilled in the art that various changes in form and details may be made therein without departing from the spirit and scope of the invention as defined by the appended claims.

(1) In the above-described illustrative embodiments, the printer 10 forms an image by the electrophotographic method, however, the present invention may be also applied to an image forming apparatus which form an image by another method such as the ink jet method, and may be also applied to an image forming apparatus which does not have the color print function. In addition, the present invention may be also applied to the cases such as the print of data received by a facsimile, the print (copy) of data read by a scanner, or the print (direct print) of data obtained from an external storage medium as the print job.

(2) In the above-described illustrative embodiments, as the image quality adjustment, the positional deviation is corrected, however, according to the present invention, for example, density correction which measures the deviation in the image formation density and corrects the deviation may be executed as the image quality adjustment. Further, as the image quality adjustment, the cleaning process such as the photosensitive drums or the belts may be executed in the image forming apparatus by the electrophotographic method, and the cleaning process of the head nozzles may be executed in the image forming apparatus by the ink jet method.

(3) In the illustrative embodiments 1 to 5, when the priority process is not executed, the image quality adjustment is executed after the print job is completed. However, in these illustrative embodiments, immediately after the adjustment execution condition is met, the image quality adjustment may be executed by stopping the condition meeting job.

(4) In the illustrative embodiments 1 and 4 to 6, similarly to the illustrative embodiment 3, when the priority process is executed, the printing process may be executed up to the color page before the image quality adjustment.

(5) The condition for determining whether the priority process is executed (S401 of FIG. 8, S501 of FIG. 10, S601 of FIG. 11, and the like) may be suitably changed, and may be combined with plural conditions.

(6) The adjustment execution condition is not limited to the above, but may be suitably changed. As the adjustment execution condition, an operation amount or a state change of the apparatus may be used, and plural conditions may be combined. In particular, by executing the image quality adjustment by the priority process, a condition which reduces the possibility to execute the image quality adjustment is advantageous as the adjustment execution condition.

What is claimed is:

1. An image forming apparatus comprising:
   a reception unit configured to receive a plurality of print jobs;
   a print unit configured to execute the plurality of print jobs received by the reception unit in order;
   a processor; and
   memory storing instructions that, when executed by the processor, cause the image forming apparatus to:
   execute an image quality adjustment for the printing;
   determine, before a start of the execution of the print job, whether an adjustment execution condition is to be met during the execution of the print job; and
   execute a priority process which, when it is determined that the adjustment execution condition is to be met during execution of a condition meeting print job that has not yet started and that there is a common attribute print job which has an attribute common to the condition meeting print job and which is to be printed before the condition meeting print job, executes the image quality adjustment immediately before printing of the common attribute print job begins.

2. An image forming apparatus comprising:
   a reception unit configured to receive a plurality of print jobs;
   a print unit configured to execute the plurality of print jobs received by the reception unit in order;
   a processor; and
   memory storing instructions that, when executed by the processor, cause the image forming apparatus to:

execute an image quality adjustment for the printing;
determine, before a start of the execution of the print job, whether an adjustment execution condition is to be met during the execution of the print job; and
execute a priority process which, when it is determined that the adjustment execution condition is to be met during execution of a condition meeting print job that has not yet started, executes the image quality adjustment immediately before printing of the condition meeting print job begins.

3. The image forming apparatus according to claim 1,
wherein the reception unit is configured to receive a plurality of print jobs,
wherein the print unit is configured to execute the plurality of print jobs received by the reception unit in order, and
wherein when there is a common attribute print job which has an attribute common to the condition meeting print job and which is to be printed before the condition meeting print job and successively to the condition meeting print job, the instructions, when executed by the processor, cause the image forming apparatus to execute the image quality adjustment immediately before printing of the common attribute print job begins, as the priority process.

4. An image forming apparatus comprising:
a reception unit configured to receive a plurality of print jobs;
a print unit configured to execute the plurality of print jobs received by the reception unit in order;
a processor; and
memory storing instructions that, when executed by the processor, cause the image forming apparatus to:
execute an image quality adjustment for the printing;
determine, before a start of the execution of the print job, whether an adjustment execution condition is to be met during the execution of the print job; and
execute a priority process which, when it is determined that the adjustment execution condition is to be met during execution of a condition meeting print job that has not yet started and the condition meeting print job includes a color page which has a color other than black and white and that there is a common attribute print jobs which has an attribute common to the condition meeting print job and which is to be printed before the condition meeting print job, executes the image quality adjustment immediately before printing of a first color page in the condition meeting print job and the common attribute print job begins.

5. The image forming apparatus according to claim 2,
wherein the image forming apparatus determines whether a printing amount of the condition meeting print job after the adjustment execution condition is met is equal to or more than a first reference value, and
wherein the image forming apparatus executes the priority process when it is determined that the printing amount is equal to or more than the first reference value.

6. The image forming apparatus according to claim 5,
wherein the image forming apparatus identifies whether each of pages in the condition meeting print job requires high quality, respectively, and
wherein the image forming apparatus uses only a printing amount of pages requiring high quality among the pages in the condition meeting print job, to determine whether the printing amount after the adjustment execution condition is met is equal to or more than the first reference value.

7. The image forming apparatus according to claim 2,
wherein the image forming apparatus determines whether a printing amount of the condition meeting print job is equal to or more than a second reference value, and
wherein the image forming apparatus executes the priority process when it is determined that the printing amount is equal to or more than the second reference value.

8. The image forming apparatus according to claim 2,
wherein the image forming apparatus determines whether the adjustment execution condition is to be met again during the condition meeting print job after executing the priority process, and
wherein the image forming apparatus does not execute the priority process when it is determined that the adjustment execution condition is to be met again.

9. The image forming apparatus according to claim 2,
wherein when it is determined that the adjustment execution condition is to be met and when the image forming apparatus does not execute the priority process, the instructions, when executed by the processor, cause the image forming apparatus to execute the image quality adjustment after a completion of the execution of the condition meeting print job.

10. The image forming apparatus according to claim 2,
wherein
when it is determined that the adjustment execution condition is to be met during one of the print jobs, the instructions, when executed by the processor, cause the image forming apparatus to notify a relationship between an execution order of the print jobs and a timing at which the adjustment execution condition is to be met.

11. The image forming apparatus according to claim 10,
wherein the image forming apparatus also notifies identification information of the print jobs when notifying the relationship.

12. The image forming apparatus according to claim 2, further comprising:
an input unit configured to, when it is determined that the adjustment execution condition is to be met, receive an input indicating a timing at which the image quality adjustment is executed from among a plurality of timings including at least an execution timing of the image quality adjustment when the priority process is executed,
wherein the image forming apparatus executes the image quality adjustment at the indicated timing.

13. The image forming apparatus according to claim 12,
wherein the instructions, when executed by the processor, cause the image forming apparatus to:
notify a relationship between an execution order of the condition meeting print job, a timing at which the image quality adjustment is executed when the priority process is to be executed, and a timing at which the image quality adjustment is executed when the priority process is not to be executed.

14. An image forming apparatus comprising:
a reception unit configured to receive a plurality of print jobs;
a print unit configured to execute the plurality of print jobs received by the reception unit in order;
a processor; and
memory storing instructions that, when executed by the processor, cause the image forming apparatus to:
execute an image quality adjustment for the printing;
determine, before a start of the execution of the print job, whether an adjustment execution condition is to be met during the execution of the print job; and execute a priority process which, when it is determined that the adjustment execution condition is to be met during execution of a condition meeting print job that has not yet started and the condition meeting print job includes a color page which has a color other than black and white, executes the image quality adjustment immediately before printing of a first color page in the condition meeting print job begins.

* * * * *